INVENTOR
CHARLES F. MORRISON

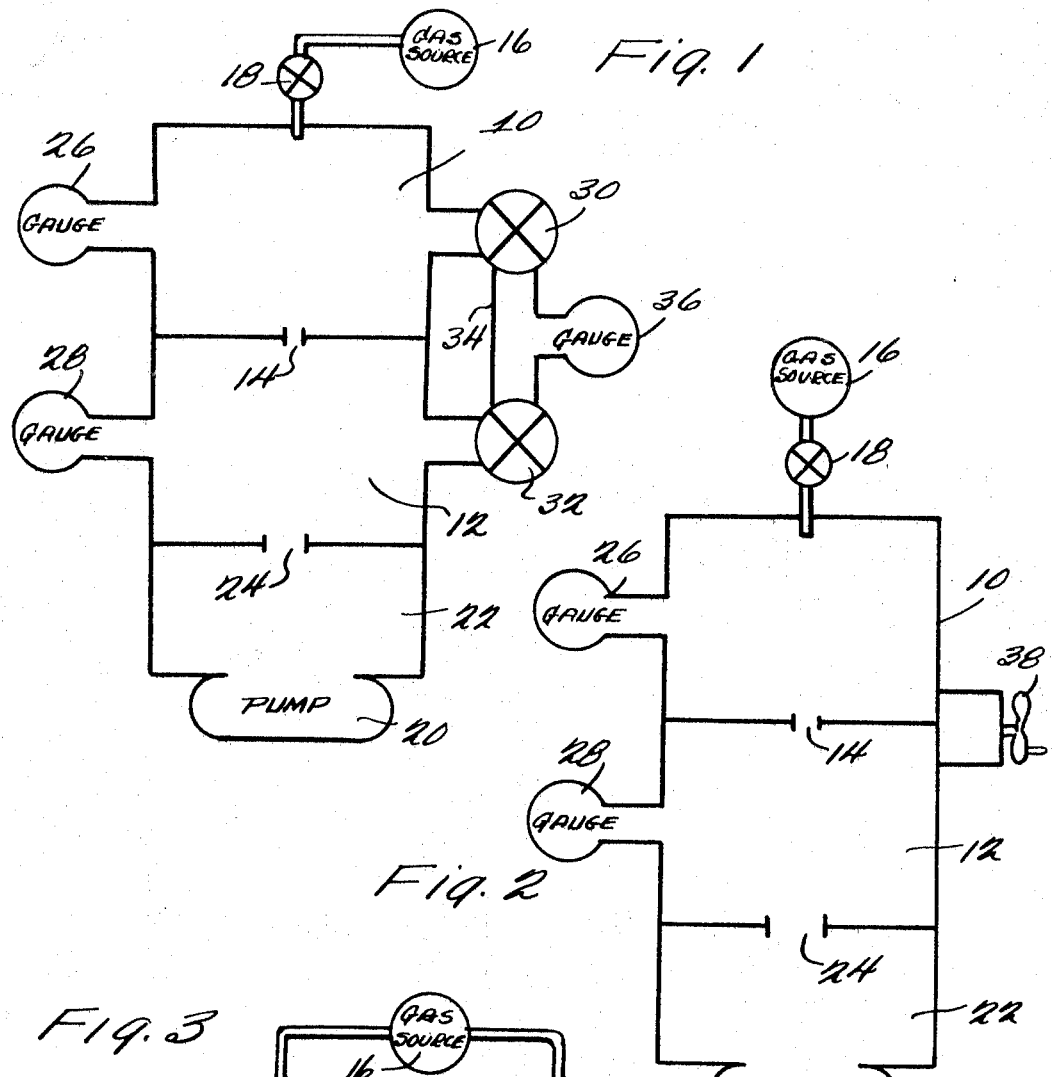

BY
Cushman, Darby & Cushman
ATTORNEYS

INVENTOR
CHARLES F. MORRISON

United States Patent Office 3,427,858
Patented Feb. 18, 1969

3,427,858
METHOD AND APPARATUS FOR DYNAMICALLY CALIBRATING VACUUM GAUGES
Charles F. Morrison, Boulder, Colo., assignor to Granville-Phillips Company, Boulder, Colo., a corporation of Washington
Filed June 23, 1966, Ser. No. 559,978
U.S. Cl. 73—4          26 Claims
Int. Cl. G01l 27/02

---

ABSTRACT OF THE DISCLOSURE

A method and apparatus for calibrating vacuum gauges is disclosed wherein a finite succession of pressures $P_n$ are sequentially generated in time. The pressures are dynamically generated in that the calibration chamber is actively pumped during every moment of the calibration procedure. One of the generated pressures is $P_R$ which is a reference pressure which is known to a desired degree of accuracy. $P_{n+1} = KP_n (K \neq 1)$ and thus, any of the pressures $P_n$ may be calculated once $P_R$ has been determined. Once $P_n$'s have been calculated, the recorded values of the gauges to be calibrated can be correlated with the respective calculated values to thereby effectuate the desired calibration.

---

This invention relates to vacuum gauge calibration and, more specifically, to improve methods and apparatus for calibrating gauges at extremely low pressures.

Calibration of vacuum gauges at pressures of $10^3$ torr and below presents many problems, not the least of which is the fact that no primary standards exist at these pressures against which a direct comparison can be made. Accordingly, at pressures less than about $10^3$ torr, indirect calibration methods must be employed wherein reference to a primary standard can only be made by transfer to a secondary standard and extrapolation of this calibration to the range of interest. A brief discusion of a few of the methods currently employed for gauge calibration at pressures below $10^3$ torr, along with some of the problems associated therewith, would seem to be in order.

The first method that should be mentioned is the so-called "static" method wherein a known volume of gas at a known high presure is expanded into a considerably larger volume; whereupon, a simple caluclation using Boyle's law will provide the necessary information on the unknown pressure assuming a constant temperature. Successive expansion of small aliquots of the expanded gas will permit the calculation of even lower pressures.

The major difficulty associated with the above-described "static" method is the considerable error introduced because of the inherent "pumping action" of all ion gauges. In other words, the quantity of the expanded gas lost through pumping will result in a substantial variation between the "calculated" and "actual" pressures. The adsorption/desorption phenomena of the gas on the system walls is also generally believed to introduce serious errors in gauges calibrated by the "static" method.

Accordingly, most researchers in the field of low pressure gauge calibration have turned to one of the several "dynamic" methods wherein a gas flowing through one or more calibrated orifices is used to provide a known lower pressure from a gas flow measurement or a higher pressure measurement.

The first of the "dynamic" systems that deserves discussion will, for purposes of convenience, be denominated the "orifice/flow system." In this system a gas is introduced into an evacuated chamber and pumped therefrom through a single orfice having a fixed calibrated conductance. The pumping speed of the orifice can easily be determined from the known conductance of the calibrated orifice and the speed of the pump. The flow of gas entering the chamber is, at least at high pressures, a measurable rate and this flow-rate coupled with the previously determined pumping speed of the orifice can be used to calculate the unknown pressure in the chamber.

The foregoing technique provides excellent results in the higher pressure ranges of $10^{-3}$ and $10^{-4}$ torr where gas flows are relatively easy to measure and control. For each calibration point, however, a separate flow measurement must be made and flow-rates at low pressures are both difficult and very expensive to make accurately. Thus, the techniques which work suite satisfactorily at $10^{-4}$ torr and above become wholly unsuitable at lower pressures.

A second "dynamic" method which we will denominate the "orifice/orifice/reference system" is, in some ways, quite similar to the previously-described "orifice/flow system" except that instead of measuring the flow-rate of the gas entering the single chamber, a second chamber is placed in communication with the first by means of a fixed calibrated orifice so that a reference pressure can be established in the added chamber. Thus, in the "orifice/orifice/reference system," gas is introduced into the first of two chambers to establish a reference pressure in said first chamber. The gas will pass into the second chamber connected to the first through the first of two known orifices having a fixed calibrated conductance. Finally, as with the previous system, gas in the second chamber is pumped therefrom through the second orifice having a fixed calibrated conductance. Knowing the conductances of both orifices, the speed of the pump and the pressure in the first of the two chambers, it becomes possible to calculate the pressure in the second chamber.

This method has the advantage of having the reference gauge operate in the first chamber which is at a higher pressure than the second chamber containing the gauge being calibrated; however, it still suffers from the serious disadvantage of the orifice/flow system in that a new reference value (pressure) must be determined for each calibration point. To accomplish the latter, the reference gauges must be capable of producing accurate readings over a wide range of pressures and, at the present time, the best available reference standard is the McLeod gauge which is considered to be reasonably accurate ($\pm 5\%$) down to only about $10^{-5}$ torr. About the limit to which the orifice/orifice/reference system can be used with anything approaching reasonable accuracy is approximately $5 \times 10^{-7}$ torr. The flow measuring equipment presently available limits the orifice/flow system to about the same value.

Both of the above-described single-stage pressure reduction systems also suffer from one of the problems of the static system in that at low pressures the ion gauges act as pumps and introduce errors in the measured pressures. Leaks in the system and "out-gassing" also contribute to the inaccuracies. The main problem remains, however, the lack of reference standards for either flow or pressure measurement over the calibration range.

These difficulties led to the third, and most sophisticated, of the dynamic systems, namely, what we shall refer to as the "multiple-chamber systems" which may be either "flow" or "pressure" referenced. In other words, this third group may be divided into two subgroups, a "multiple-chamber/flow system" analogous to the "orifice/flow system" and a "multiple-chamber/reference system" analogous to the "orifice/orifice/flow system." Both the "flow-oriented" and "pressure-oriented" versions of the "multiple-chamber system," as the name implies, utilize a series of serially interconnected chambers separated by orifices of known conductance located in the partition walls therebetween. In addition, however, each of the several chambers must be equipped with a vacuum pump capable of taking each stage down to a successively lower pressure along with a calibrated orifice.

In the "flow-oriented" version of the multiple-chamber system, the flow of gas must be carefully and accurately monitored as in the single-stage "orifice/flow system." Here, however, the flow meter need not have the capability of covering the entire range over which the gauges are to be calibrated, but instead, it can be either transferred or valved from chamber to chamber and thus cover a wide range of pressures.

In the multiple-chamber/reference system, a reference pressure gauge is either transferred or valved from chamber to chamber and thus covers a wide range of pressures as was the case with the flow-referenced multiple-chamber system. For this reason, the reference gauge is not required to cover a broad range of pressures. Thus this system also has the advantage of the single-stage "orifice/orifice/reference system" in that the reference gauge is, in all but the final stage, reading a pressure one or more stages upstream of the gauge being calibrated.

The multiple-chamber systems described above provide, up to now, the only known methods of calibrating gauges down in the low pressure ranges around $10^{-9}$ torr and below with reasonable accuracy. Relatively few such systems exist primarily because they are prohibitively expensive. As aforementioned, each stage requires a separate pump and, as the pressures decrease, the pumps capable of achieving these low pressures become a great deal more costly. Even the hardware consisting of leak-proof high-vacuum valves and couplings, orifices, cold traps, piping and the like, add significantly to the cost of such a system. By way of example, the commercially-available multiple-chamber/pressure systems cost upwardly of $70,000.

Disregarding for the moment the prohibitive cost of such systems and their inconvenience when attempting to calibrate over a wide range of pressures, the fundamental deficiency still exists of having to establish a new reference value for each calibration point. Up to now, no dynamic calibration system, whether it be single- or multiple-stage, flow- or pressure-oriented, has overcome this problem.

It becomes possible, therefore, to postulate an ideal vacuum gauge calibration system. To begin with, such a system would require only one reference value (flow-rate or pressure) irrespective of the number and range of the calibration points. Secondly, the reference value would be selected such that it fell within the range of maximum accuracy of the reference standard. One, or at most two, vacuum pumps would be used and each would be capable of establishing vacua covering the entire range over which the gauges are to be calibrated. The foregoing would, of necessity, result in the elimination of much of the excess auxiliary hardware such as traps, flanges, valves, orifices, and vacuum chambers necessary in the multiple-chamber systems, although one or more of each of these elements would still be required. The overall cost of such an ideal system would be a small fraction of the cost of existing systems covering the same calibration ranges, yet, would produce considerably more accurate results.

It has now been found in accordance with the teaching of the instant invention that the foregoing ideal system can be approached quite closely, if not actually realized through the use of presently-available components. The primary novelty of the invention herein disclosed lies in the method of utilizing this equipment although the arrangement of the components for use in accordance with the method also includes novel aspects. It can be either gas-flow-referenced or gas-pressure-referenced, there being standards of both types available which provide the necessary accuracy within the selected narrow range of reference values. The heretofore unrecognized secret that enables one to calibrate gauges quite accurately at pressures far less than that at which reliable standards exist comprises the simple, but unobvious, expedient of cyclically stepping the gauges being calibrated up through a series of unknown pressures until ultimately a pressure or flow-rate is reached at which the reference becomes reliable, whereupon, the single reference reading is taken and all of the other calibrated points are re-produced therefrom by a simple mathematical or graphical calculation.

Accordingly, it is the principal objective of the present invention to provide novel and improved methods for calibrating vacuum gauges at pressures including those well below the recognized reliability of the available reference standards.

A second object is to provide apparatus that is made up from a novel arrangement of standard components by means of which the foregoing calibration methods may be implemented.

Another objective of the invention disclosed and claimed herein is to provide vacuum gauge calibration methods that require only a single actual pressure or flow-rate measurement to be made and such measurement is made in the range of maximum accuracy of the reference standard.

Still another object is the provision of calibration methods of the type above-described that enable the range of calibrated pressures to be extended well beyond those which were attainable heretofore with any reasonable degree of accuracy with a single stage calibrator.

An additional object is to provide apparatus for carrying out the aforesaid calibrations that is considerably simpler to use and a great deal less expensive than that presently employed for the purpose while, at the same time, producing more accurate results over ranges of pressures that were, up to now, completely impractical.

Another object of this invention is to provide an improved method and apparatus for dynamically generating a succession of pressures sequentially in time whereby each of the pressures is related to the one succeeding it by a known mathematical relationship thereby facilitating the calibration of vacuum gauges by correlating the readings of the vacuum gauges to each of the respective pressures calculated from the mathematical relationship.

Another object of this invention is to provide an improved method and apparatus for calibrating vacuum gauges by comparing readings of vacuum gauges directly connected to a vacuum pump with corresponding calculated pressures described in the last-mentioned object of the invention.

Another object of this invention is to provide improved apparatus for dynamically generating a succession of accurately measurable pressure steps sequentially in time where the steps are of varying magnitude.

Further objects are to provide methods and apparatus for calibrating vacuum gauges at extremely low pressures that are versatile, convenient, reliable, compact, faster than prior art systems for the same purpose, rugged, safe and readily adapted for use with various reference standards.

Other objects will be in part apparent and in part pointed out specifically hereinafter in connection with the detailed description of the drawings that follows, and in which:

FIGURE 1 is a diagrammatic representation of a first embodiment of the invention;

FIGURE 2 is a diagrammatic representation of a second embodiment;

FIGURE 3 is a diagrammatic representation of a third embodiment of the invention;

Figure 4:
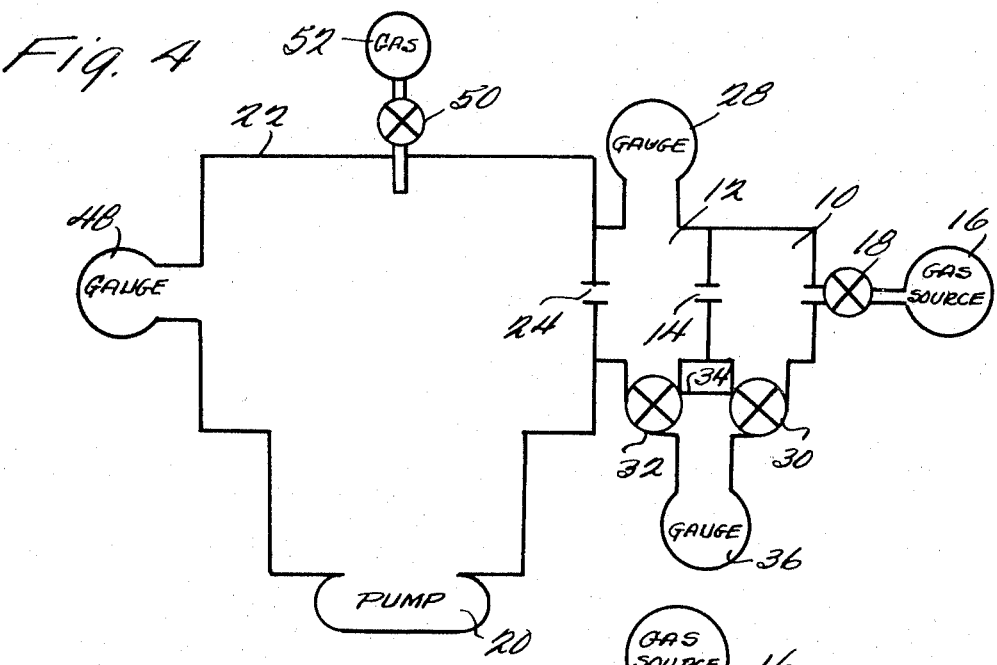
FIGURE 4 is a diagrammatic representation of the invention illustrating a modification to FIGURE 1.

Reference should now be made to FIGURE 1 which shows diagrammatically a first embodiment for dynamically calibrating a pressure gauge. The device comprises chambers 10 and 12 which are separated by an orifice 14, a gas source 16 provides gas to chamber 10 through control valve 18. A vacuum pump 20 is connected to pump chamber 22. An orifice 24 separates chambers 12 and 22.

Gauges 26 and 28 are respectively connected to chambers 10 and 12. Either of the gauges 26 or 28 may represent a reference gauge which is able to measure a reference pressure to a known degree of accuracy. Or they may represent the gauges to be calibrated—that is, gauge 26 may be the reference gauge and gauge 28 may represent a plurality of gauges which are to be calibrated or vice-versa.

Also attached to chambers 10 and 12 are by-pass valves 30 and 32 respectively. These valves are both connected together through appropriate tubing 34, gauge 36 being attached to tubing 34. It would be obvious to one having ordinary skill in this art to construct the arrangement shown in FIGURE 1 taking into consideration many of the finer points of the art such as gas flow baffles, symmetry, etc. This also applies to the other diagrammatic representations shown in the other figures of the drawings.

Having now described the structure of the first embodiment of the invention, the operation thereof will be described. The pressure in chamber 10 will be referred to as pressure $P_i$ and the pressure in chamber 12 will be $P_j$. Thus, whenever, equilibrium conditions are established in the chambers 10 and 12 while introducing gas from source 16 through valve 18 with either valve 30 or 32 closed, pressure $P_j$ is determined as follows:

$$P_j = KP_i \quad (1)$$

where K is a function of the conductances of the orifices 14 and 24.

Before establishing the pressure difference or division exemplified by Equation 1, it is desirable to pump down the entire system with valves 30 and 32 open, bake it, and then cool it. This will clean the system out in preparation for calibrating the gauges 26 or 28. It will be assumed that gauge 26 is the reference gauge, gauge 28 represents a plurality of gauges connected to the chamber 12 and that the pressure in chamber 22 is negligible. Valve 32 is then closed and gas is introduced from source 16 through valve 18 until the pressure division is established. The pressure $P_j$ then corresponds to the lowest calibration pressure. This pressure is an arbitrary value and may correspond to a pressure ten times greater than the ultimate pump down pressure of the system. Once the gauge 36 has attained a stable reading of the pressure $P_j$, the values of the gauge readings 26 and 28 are recorded.

The pressure $P_i$ just recorded on the gauge 26 must now be transferred to the chamber 12 at the same time a new value of $P_i$ must be obtained by increasing it in accordance with Equation 1. This is accomplished by opening valve 32 while closing valve 30. During this step, the reading of gauge 36 must be maintained constant in order to insure the correct transfer of the pressure $P_i$ as stated above. At the same time that the valves 30 and 32 are being closed and opened respectively, more gas is introduced into the system through valve 18 to cause the pressure $P_j$ in chamber 12 to rise to the value of pressure $P_i$ which was formerly chamber 10. After the new pressure $P_i$ is once again related to the new pressure $P_j$ by Equation 1, all that is necessary to complete the pressure increment cycle in the chambers 10 and 12 is return the valves 30 and 32 to the position they were originally in when the cycle commenced. This is accomplished by opening and closing valves 30 and 32 respectively. At the same time, the pressure $P_j$ in chamber 12 is kept maintained constant by maintaining the reading of gauge 28 constant as gas is introduced into the system through control valve 18.

It can now be readily seen that the pressures $P_i$ and $P_j$ are members of two different finite successions of pressures which are established respectively in the chambers 10 and 12. Each of these successions of pressures is dynamically generated (that is, by gas flowing through one or more calibrated orifices). Further, the pressures $P_j$ in chamber 12 are relatable to the pressures $P_i$ in chamber 10 by Equation 1. Thus, broadly speaking, the invention may be thought of in terms of a single finite succession of pressures $P_n$ which may occur in either of the chambers 10 and 12 or both, where n equals 1, 2, 3 . . . L and where $P_n$ is related to $P_{n+1}$ by a known mathematical relationship such as Equation 1—that is, $$P_{n+1} = KP_n \quad (2)$$

When the pressure in chamber 10 is raised to a point where it can be measured by the reference gauge 26 to a desired degree of accuracy, it is then possible to calculate each of the pressures generated in chambers 10 and 12 by Equation 2. Broadly speaking, the pressures which can be measured to a desired degree of accuracy, is a reference pressure $P_R$. $P_R$ will necessarily be one of the pressures included in the succession of pressures $P_n$. It is not necessary that $P_R$ be the first or the last of the pressures $P_n$—that is, it may be any one of these pressures. Further, $P_{n+1}$ may be greater than $P_n(K>1)$ or less than $P_n(1>K>0)$. Having established an accurately measured $P_R$, it is an obvious step to calculate any of the $P_n$ from $P_R$. The error can be kept below 1% per step of separation from $P_R$. Thus, multistage behavior is obtained from a single stage device.

Another important distinguishing feature of the succession of pressures $P_n$ generated by the invention is characterized by the fact that the sequence is generated sequentially in time. As hereinbefore stated, a multichamber or multistage system may be employed at a tremendous expense to generate a simultaneous succession of pressures sequentially in space. However, by generating this succession in time, substantial economies are achieved.

Thus, it can now be seen that the succession of pressures $P_n$ is established by generating at least two finite sequences of pressures $P_i$ and $P_j$ respectively where $i=1, 2, 3 \ldots L$ and $j=1, 2, 3 \ldots Q$, where Q may equal $L-1$, L, or $L+1$ depending on the method employed to generate the two finite sequences of pressures. Thus, broadly speaking, Q is a function of L. Further, in the embodiment in FIGURE 1, $P_i$ is changed to $P_{n+1}$ at the same time that $P_j$ is changed to $P_n$. In further embodiments of the invention, further methods for changing $P_i$ and $P_j$ to establish the basic succession pressures $P_n$ will be described.

Referring to FIGURE 2, there is shown a calibrating system similar in many features to that shown in FIGURE 1. Only the differing characteristics will be described in detail, common reference numerals referring to elements with similar functions. A gate valve 38 is connected between chambers 10 and 12 so that when the gate valve is open chambers 10 and 12 become essentially one chamber. Gate valve 38 replaces the bypass valves 30 and 32 and the gauge 36 shown in FIGURE 1.

The arrangement of FIGURE 2 operates as follows: The system is once again pumped down and baked, this time with valve 38 open. The pressure $P_i$ is then raised to the pressure corresponding to the first calibration point by introducing calibrating gas through control valve 18 with valve 38 closed. After equilibrium has been obtained, the relationship between $P_i$ and $P_j$ is determined by Equation 1.

After this, it is necessary to raise the pressure $P_j$ in chamber 12 to that of pressure $P_i$ in chamber 10. This is accomplished by opening the valve 38 and transferring the pressure $P_i$ in chamber 10 to chamber 12 while at the same time maintaining the pressure $P_i$ approximately constant. The reading of gauges 26 and 28 are recorded.

Gauge 28 is then kept constant and the gate valve 38 is closed. Pressure division is established by introducing more gas through valve 18 thereby establishing a new pressure in chamber 10 which is a fixed ratio higher than its previous value as established by Equation 1. The pressure stepping or changing cycle is now complete and it may be re-performed until the pressure $P_i$ attains a sufficiently high value corresponding to the reference pressure $P_R$ which can be accurately measured.

It can now be seen that the basic pressure $P_n$ in FIGURE 2 is established by changing $P_i$ to $P_n$ and then changing $P_j$ to $P_n$ before $P_i$ is changed to $P_{n+1}$.

Reference should now be made to FIGURE 3 which illustrates a further method of changing pressures $P_i$ and $P_j$ to establish the pressures $P_n$. In this embodiment, basically the method is to change $P_i$ to $P_n$ and then change $P_j$ directly to $P_{n+1}$ as opposed to $P_n$ as was done in FIGURE 2. Only those features which distinguish from prior embodiments will be discussed in detail. Here, an additional calibrating valve 40 is connected to the gas source 16 to control the flow of gas into chamber 12. An additional vacuum pump 42 is connected to a chamber 44 which is connected to chamber 10 through orifice 46. It would also be possible to use a single vacuum pump and switch it between the chambers 10 and 12. This would depend on the availability of suitable means for accomplishing the switching function.

The operation of the calibrating system shown in FIGURE 3 is as follows: The system is once again pumped down and baked as before. Calibrating gas is then admitted through valve 18 to establish the first calibration pressure in chamber 10. Once equilibrium has been attained the pressure in chamber 10 will be greater than that in chamber 12 in accordance with Equation 1. All gauges are then recorded. It will be understood it is necessary to always record gauges in chambers 10 and 12 whenever a pressure cycle or pressure increment or decrement has been established. The gauge 26 is kept constant while the valve 18 is closed and the valve 40 is opened. Thus, the pressure in chamber 12 rises to a value greater than that in chamber 10 as determined by the conductances of the orifices 14 and 46. Preferably the conductances of the orifices 24 and 46 are equal in value and therefore all pressure steps are equal. However, in some applications it may be desirable to have these conductances be of different values. Hereinafter, a further embodiment of the invention will be described where the size of pressure steps can be varied at will.

Reference should now be made to FIGURE 4 where a significant addition is made to the calibration system shown in FIGURE 1. The system of FIGURE 1 may basically be considered as a 2-chamber system—that is, chambers 10 and 12. However, the calibrating system of FIGURE 4 employs the pump chamber 22 as an active element. Further, gauge 48 mounted on the pump chamber 22 represents the plurality of gauges which are to be calibrated. Also connected to pump chamber 22 is a control valve 50 connected to a suitable source of gas 52.

Thus, the calibrating system shown in FIGURE 4 may be considered a 3-chamber system. Because of this addition, the following advantages are obtained. In the calibrating systems illustrated with respect to FIGURES 1 through 3, the gauges to be calibrated are placed on the chambers 10 and 12. In FIGURE 4, however, these gauges are placed on the pump chamber 22. Thus, in the system of FIGURE 4, the chambers 10 and 12 may be much smaller than required in FIGURES 1 through 3. This reduces the gas load in the part of the system which is isolated from the pump by a low conductance orifice thereby increasing the range of attainable calibration pressures. The pumping and/or outgassing of the uncalibrated gauges 48 in FIGURE 4 has a negligible effect on the calibration pressure because there is no flow restriction required in the generation of the calibration pressure steps which is located between these uncalibrated gauges and the pump.

In the operation of all of the prior art dynamic calibration systems presently available for use in ultra high vacuum the gauges under calibration are pumped thru a relatively small orifice. Thus, it is questionable whether full electron emission can be used on even one or two gauges at a time without their pumping causing a serious error in the effective orifice conductance value. Also, outgassing, as stated above, from the gauge tubes may render the gas flow sufficiently in error to seriously influence the calibration. Even though these effects may be minimized thru good vacuum technique, the disturbing possibility still exists that a maverick gauge tube can seriously degenerate the accuracy of the proceedings or perhaps invalidate an entire calibration run.

In addition to the aforementioned considerations, a large pump, or series of them, is required to meet the condition that the pump pressure be vanishingly small relative to the calibration pressure. The large pump contributes only to the decrease in error by decreasing the need for accurate measurement of the pump pressure, it does not speed the pump down of the system appreciably nor grossly lower the system's ultimate pressure because the pump is constantly working thru a limiting molecular flow orifice which is by design a conductance trivial compared with the pump speed. Some gain might be made by removing the orifice restriction during pump down, but though this may speed the pump down, it does not remove the major problems of interaction during calibration nor lower the ultimate calibration pressure appreciably. Thus, in addition to the worry that the lack of pumping speed from the calibration chamber may allow one gauge to adversely affect the calibration of all, one is plagued with the realization that a very adequate and expensive pump is loafing just below the orifice.

These problems may be simply solved in systems which are designed solely for the comparison of a calibrated gauge with uncalibrated gauges to attain a secondary type of calibration. In this case the pump operates directly on the gauges being calibrated, grossly decreasing their interaction, and lowering the pressure at which a satisfactory comparison can be made. A serious problem relative to using the extended range of the comparison type of calibration system is the availability of suitably calibrated gauges against which to make the desired wide range comparison.

To take full advantage of the range extension and lack of interaction that are afforded by the comparison type of calibrator, the calibration described with respect to FIGURES 1–3 or other calibrators which dynamically generate a succession of pressures sequentially in time may be employed with the comparison type calibrator. Combining the comparison technique with the pressure stepping methods of FIGURES 1–3 yields a wide range system with many virtues as will become further apparent hereinafter.

Broadly speaking, a succession of pressures $P_k$, where $k$ equals 1, 2, 3 . . . R are generated in the pump chamber 22 by calibrating gas introduced through control valve 50 where R is a function of L, as defined hereinbefore. These pressures are generated after the pressures $P_i$ and $P_j$ are changed in the chambers 10 and 12, as will be shown below. Thus, by comparing the readings of the gauges corresponding to the pressures which occur at gauge 28, the gauges 48 can be calibrated, the pressures developed at gauge 28 being calculated by the method described with respect to FIGURE 1.

Specifically, the embodiment of FIGURE 4 operates as follows. The system is pumped down and baked as usual. Calibrating gas is then admitted through valve 50 to raise the pressure in pump chamber 22 to the first calibration point. The valve 18 is closed and the valves 30 and 32 are open at this time. Thus, when the equilibrium condition is attained, the pressure will be the same in chambers 10, 12, and 22. The gauges 28 and 48 are then recorded.

It is now necessary to increase the pressure $P_j$ in chamber 12 by the predetermined pressure step which is a function of the dimensions of orifices 14 and 24. The reading of the gauge 28 is maintained constant while valves 32 and 50 are closed. Valve 18 is controlled to admit calibrating gas through chambers 10 and 12. The pressure in chamber 10 will step in accordance with the relation defined by Equation 1. After the system has settled down, it then becomes necessary to transfer the pressure step developed in chamber 10 to chamber 12. This is accomplished by closing valve 30 and opening valve 32 while maintaining the reading of gauge 36 constant and admitting additional calibrating gas through valve 18 to develop the required pressure increase in chamber 12.

Once the pressure step developed in chamber 12 has been recorded, it is necessary to transfer this pressure to the pump chamber 22. After this pressure is transferred to chamber 22, the readings of the gauges 48 are recorded and the pressure corresponding to these readings is determined by referring to the corresponding pressure calculated for gauge 28 from the mathematical relationship defined by Equation 1. The pressure in pump chamber 22 is brought up to that in chamber 12 by closing valve 18 and opening valves 30 and 32 and admitting calibrating gas through valve 50 while at the same time maintaining the reading of gauge 28 constant. When equilibrium is attained, the pressure in all chambers will be the same and equal to the reading on gauge 28. At this point, the cycle is complete and the above steps may be re-performed to achieve the next pressure step in the system. Eventually the reference pressure range will be reached and the pressure may be measured by a reference gauge (not shown) which is preferably connected to chamber 22. When the pressure is high enough to be accurately measured a reference gauge may be valved into the system.

It can now be seen that the primary differences between the embodiments of FIGURES 1 and 4 are: (1) the mounting of the gauges to be calibrated on the pump chamber 22, and (2) the determination of the calibration pressures of the gauges 48 by the indirect method of comparing the readings corresponding to these pressures with the respective pressures of chamber 12 which are calculated from the mathematical relationship defined in Equation 1. In this connection, it should be noted that gauge 28 is initially an uncalibrated gauge. The calibration pressures for this gauge are determined by calculations which employ Equation 1, whereas the calibration pressures for gauges 48 are not calculated directly from Equation 1 but instead are determined by comparing the successive indications occurring at each of the gauges 48 with the corresponding successive pressures developed at gauge 28.

Figure 9:
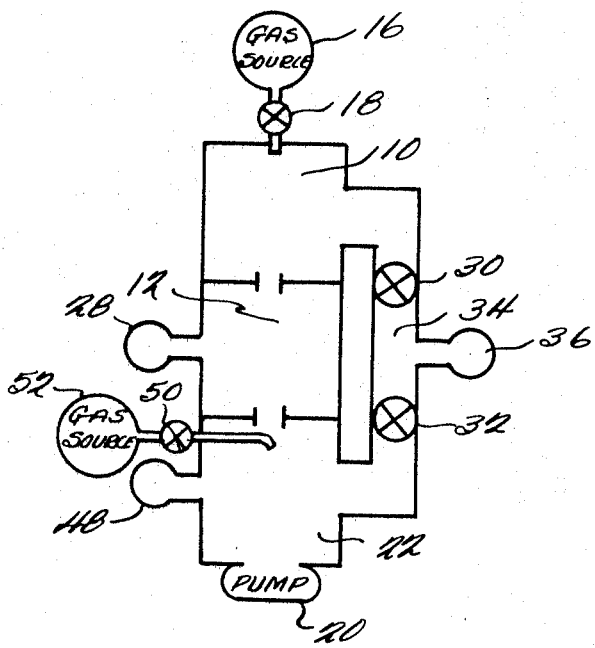
FIGURE 9 is a diagrammatic representation of the invention illustrating a modification to FIGURE 4.

Referring to FIGURE 9, there is shown a modified embodiment of FIGURE 4, wherein the valve 32 is connected to pump chamber 22 rather than chamber 12.

The operation is as follows: calibrating gas is admitted through valve 50 with valves 30 and 32 open and valve 18 closed to establish the first calibrating pressure in chambers 10, 12, and 22. After the system settles down, all gauges are recorder, especially gauge 28. The pressure is then increased in chamber 10 by opening valve 18 and closing valves 32 and 50, while maintaining the reading of gauge 28 constant. After the system settles down once again, the pressure in chamber 10 is the new pressure step, which is next transferred to pump chamber 22 by opening valves 32 and 50 and closing valves 18 and 30, the new pressure in chamber 10 is transferred to chamber 22 by maintaining the reading of gauge 36 constant. The gauges 28 and 48 are recorded. Thus, the pressure stepping cycle is complete and the next cycle is ready to be performed.

Much of the complexity of this cycle can be eliminated by merely eliminating valve 30 as has been done in FIGURE 5, which will be described in more detail hereinafter.

It would be obvious to one having ordinary skill in this art to attach to the pump chamber 22 shown in FIGURES 2 and 3 the uncalibrated gauges 48, the additional gas source 52, and valve 50 and operate these systems in a manner analogous to that described for FIGURE 4 where the pressure increments would be derived in accordance with the description given hereinbefore with respect to FIGURES 2 and 3.

Figure 5:
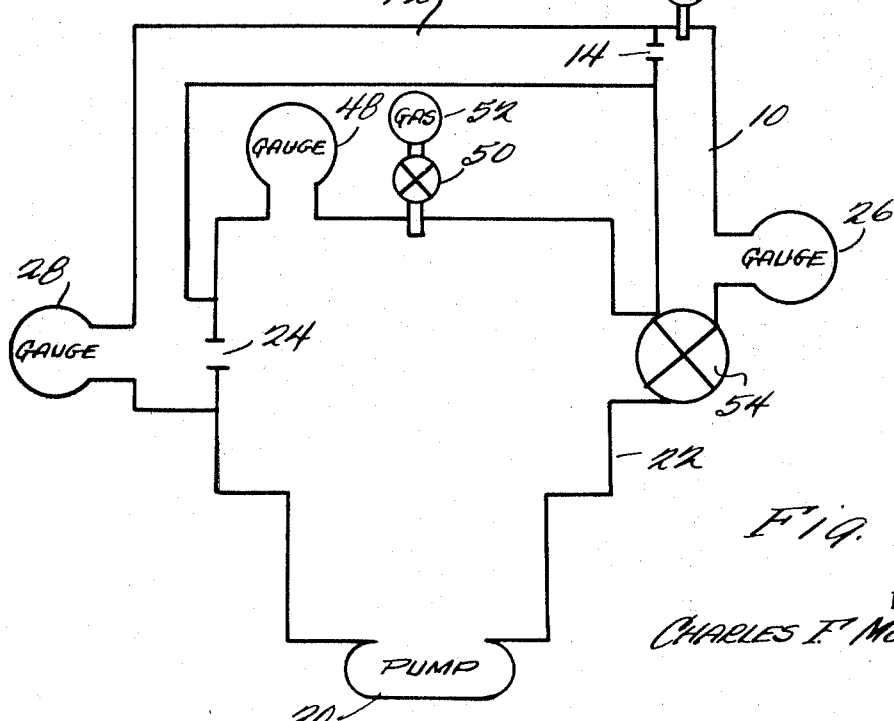
FIGURE 5 is a diagrammatic representation of a fourth embodiment of the invention.

Referring now to FIGURE 5, there is shown another arrangement wherein the gauges to be calibrated are connected to the pump chamber 22. However, because of considerations based on ultimate calibration pressure, complexity and component cost, and operational simplicity, this embodiment is preferred over that shown in FIGURE 4 or 9.

In the embodiment of FIGURE 5, a bypass valve 54 connects chamber 10 to pump chamber 22. The remaining elements are similar in function to those already shown and described with respect to FIGURE 4.

The operation of FIGURE 5 will now be described: calibrating gas is introduced through valve 50 into chamber 22 while valve 54 is open and valve 18 is closed. After equilibruim is attained, the first calibrating pressure exists in chambers 10, 12, and 22. At this point, the first calibrating point is established and all gauges are recorded. Valves 50 and 54 are then closed and valve 18 is opened to increase the pressure in chamber 10 from $P_n$ to $P_{n+1}$, for example, as defined by Equation 1 while maintaining the reading of gauge 28 constant. All gauges are again recorded.

It is now necessary to transfer the new pressure $P_{n+1}$ developed in chamber 10 to pump chamber 22. This is done by opening valves 50 and 54 and closing valve 18. Gauge 26 is then maintained constant while calibrating gas is admitted through valve 50 so that an equilibrium condition is attained where the pressures in chambers 10 and 22 are equal. The readings of gauges 28 and 48 are then recorded. The pressure stepping cycle is now complete and may be reperformed as many times as is necessary. The gauges 48 are comparison calibrated from the respective calculated values of pressure corresponding to gauge 28 in the same manner as that described for FIGURE 4.

Figure 6:
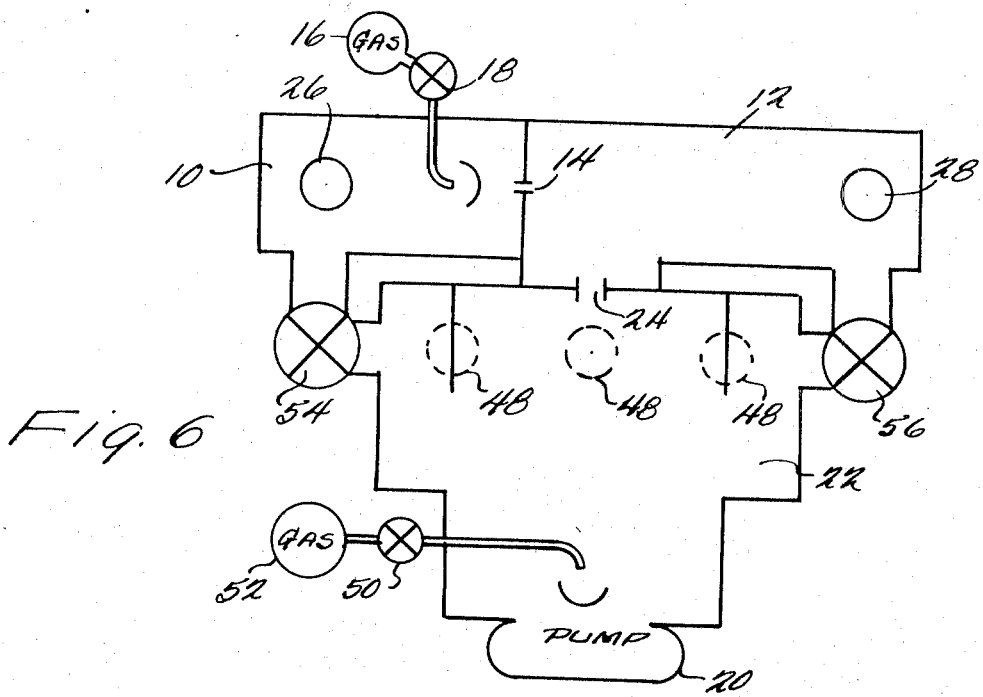
FIGURE 6 is a diagrammatic representation of the invention illustrating a modification to FIGURE 5.

Referring now to FIGURE 6, another embodiment of the systems disclosed in FIGURES 4 and 5 is shown. The only difference between the embodiments of FIGURES 5 and 6 is that a bypass valve 56 is connected between the chamber 12 and the pump chamber 22. In this modification, the speed and accuracy of operation are further improved.

The operation of FIGURE 6 is as follows: The valves 54 and 56 are initially open and the system is pumped down and baked as required. Calibration gas is added through valve 50 with valve 18 closed to increase system pressure to the first calibration point. The system is then allowed to stabilize at this value. Next all gauges are read, especially gauge 28. Valves 54 and 56 are then closed. Gauge 28 is maintained constant at the first calibration point by opening control valve 18 while closing control valve 50. The system is allowed once again to stabilize. The pressure in chamber 12 is thus the initial calibration pressure as seen by gauge 28. The pressure $P_{n+1}$ in chamber 10 is the next higher calibration pressure and the pressure in chamber 22 is the pump pressure under the gas flow conditions necessary to generate the above pressures. Obviously, the quantity of gas involved is much less than that required when valve 50 was employed to raise the chamber 22 pressure to the initial calibration point. Thus, the pressure in chamber 22 is much less than that in chamber 12. Hence, it will be assumed that the pump pressure is negligible as has been done in all of the foregoing descriptions of the various embodiments of the invention. If, however, the pump speed were not sufficiently high, a crude measurement of the pressure in chamber 22 would be sufficient for calibration accuracy.

Returning to the pressure stepping cycle, it is next necessary to bring the pressure $P_{n+1}$ in chamber 10 into chamber 22. This is accomplished by maintaining gauge 26 constant at its last-mentioned value while opening valves 54 and 56 and closing valve 18 while admitting calibrating gas through control valve 50. Calibrating gas is increased until a stabilized condition is established which results in the pressure $P_{n+1}$ in chamber 22 being the same as that in chamber 10.

Any parallax errors which exist in the comparison transfer from chamber 12 to chamber 22 are compensated for by the equivalent exchange which occurs when the new pressure $P_{n+1}$ in chamber 22 is comparison transferred into chamber 12 to start the generation of the next pressure step. This follows since the pressure in chambers 10 and 12 may be slightly higher than the pressure in chamber 22 during this equalization step due to out-gassing of these chambers and the fact that they are more remote from the pump 20. Because both chambers 10 and 12 are affected, the net effect will be quite minor during the stepping repetitive process.

The cycle is now complete. Sufficient repetition of this cycle will increase the pressure to the point where the true pressure can be accurately determined by one of the several types of reference systems. If an absolute reference gauge is used in chamber 22 to determine the exact value of pressure there after the last pressure step, no further concern over the comparison error need be felt as it will have been cancelled satisfactorily. If, however, the reference gauge is on chambers 10 or 12, then it must be carefully determined that the pressure difference between chamber 22 and chambers 10 and 12 is indeed trivial. Using the embodiment of FIGURE 6, the effect of this comparison error on the resulting calibration is less than one percent at higher calibration pressures and increases by 0.1% (or less) per pressure step. This error is considerably less than the pumping and out-gassing uncertainty in the embodiments shown in FIGURES 1 through 3. However, it must be emphasized that the embodiments of FIGURES 1, 2, and 3 still significantly outperform prior art calibration devices.

Figure 7:
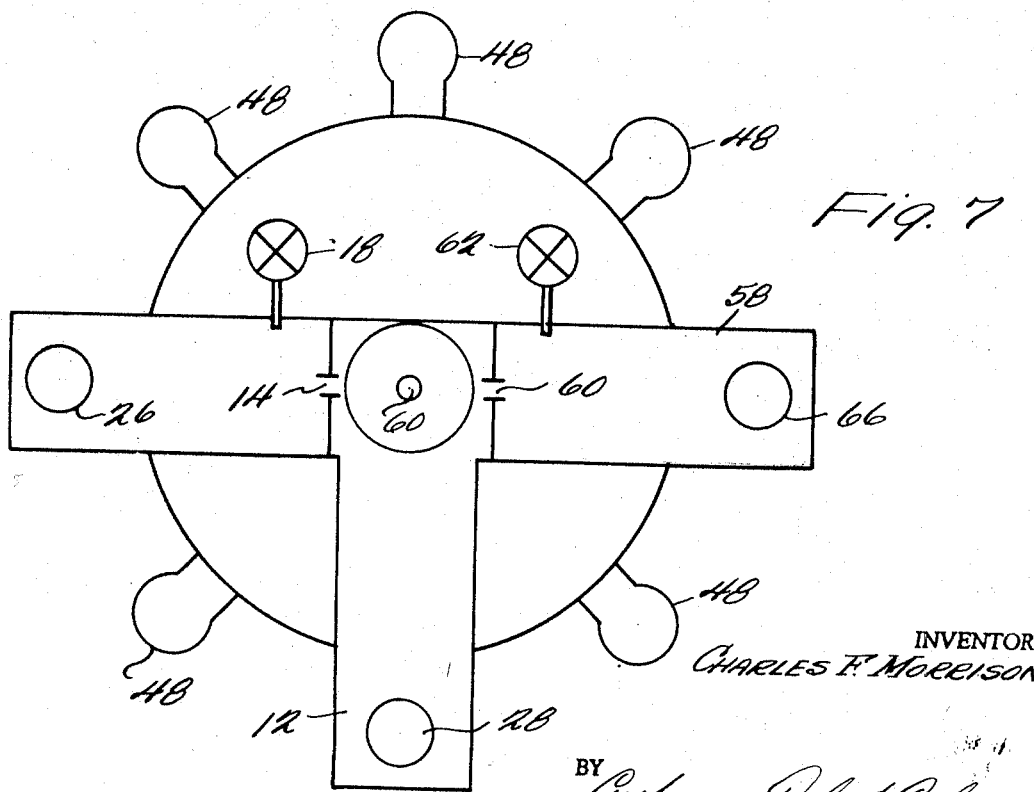
FIGURES 7 and 8 are respective side and top views of a fifth embodiment of the invention.
Figure 8:
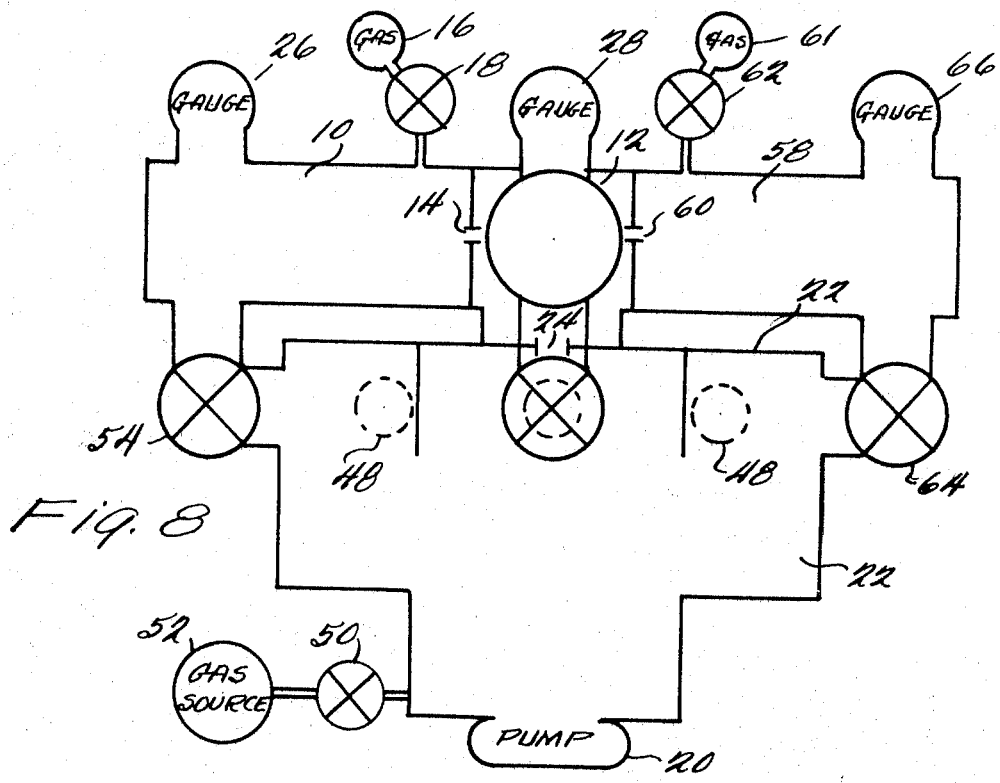

Reference should now be made to FIGURES 7 and 8 which respectively show top and side views of an embodiment of the invention which allows the pressure step size to be changed in magnitude. In all of the embodiments shown in FIGURES 1 through 6, the only way to change pressure step size is to replace the orifices 14 and 24 with ones of a different ratio, a task of some significance. If the orifice ratio is made purposely small so that many calibration points are obtained, the calibration procedure is necessarily lengthy even when fewer points are required. Hence, in some instances it is desirable to provide a multiple ratio device as shown in FIGURES 7 and 8. This device is similar in operation to that shown in FIGURE 5 and only those features which are different will be described in detail. An additional chamber 58 is connected to chamber 12 at the side opposite from chamber 10. Control valve 62 is provided for admitting calibrating gas to chamber 58. A bypass valve 64 connects chamber 58 to chamber 22 and uncalibrated gauge 66 is connected to chamber 58. Thus, the control valve 62, bypass valve 64, and gauge 66 of chamber 58 are substantial duplicates of the functions of control valve 18, bypass valve 54, and gauge 26 of chamber 10. The only difference between these two arrangements is the size of the orifices 14 and 60.

The operation of the embodiment shown in FIGURES 7 and 8 will now be described. This system employs chambers 10 and 12 or 58 and 12, depending on the ratio desired. If valves 62 and 64 are closed, the system is identical to that of FIGURE 5 in the operation thereof. However, if valves 18 and 54 are closed, the valves 62 and 64 are employed in the manner described with respect to FIGURE 5, the operational steps being the same but the size of the pressure steps being different. Assuming that the dimension of orifice 14 is substantially larger than that of orifice 60, it would be desirable to use the small pressure steps obtainable from orifice 60 at very low pressures where there is often a non-linearity in the gauge response due to spurious currents. When in the linear range of the gauge it is desirable to use large pressure steps and thus the orifice 14 would be employed at this time. When in the high pressure regions, the gauge can again be expected to be non-linear, therefore the use of orifice 60 would again be resorted to. Thus, it can now be seen that with such a system, the orifice ratios may be used in any desired sequence such as to obtain additional points at any part of the calibration sequence. There is also added accuracy available from the use of the largest ratio in that those points far from the absolute reference may be reached in a minimum number of steps, thus reducing the number of steps and thereby the cumulative error which increases as the number of steps increase.

Broadly speaking, there is dynamically generated in chamber 58 a succession of pressures $P_m$ sequentially in time where $m=1, 2, 3 \ldots S$ which is a function of L, as defined hereinbefore. Further, since either valves 18 and 54 may be both closed or valves 62 and 64 may be both closed, means are provided for selecting the pressure step or change desired.

Numerous modifications of the invention will become apparent to one of ordinary skill in the art upon reading the foregoing disclosure. During such a reading, it will be evident that this invention has provided a unique method and equipment for accomplishing the objects and advantages herein stated. Still other objects and advantages, and even further modifications will be apparent from this disclosure. It is to understood, however, that the foregoing disclosure is to be considered exemplary and not limitative, the scope of the invention being defined by the following claims.

What is claimed is:

1. A method for calibrating at least one vacuum gauge connected to a calibration chamber comprising the steps of:
   establishing a reference pressure $P_R$ which is known to a desired degree of accuracy;
   generating in said calibration chamber a finite succession of pressures $P_n$ sequentially in time, one of which is $P_R$, where $n=1, 2, 3 \ldots L$ and where $P_n$ is related to $P_{n+1}$ by a known mathematical relationship so that said $P_n$ can be calculated from $P_R$;
   continuously pumping said calibration chamber while said pressures $P_n$ are being generated; and
   recording the value of the said gauge for $P_n$, said recorded value being eventually subject to correlation with the calculated value of $P_n$.

2. A method as in claim 1 where $P_R = P_L$.

3. A method as in claim 1 where $P_R = P_1$.

4. A method as in claim 1 where said mathematical relationship is $P_{n+1} = KP_n$ where $K > 0$, K being of constant value and $K \neq 1$.

5. A method as in claim 4 where $1 > K > 0$.

6. A method as in claim 4 where $K > 1$.

7. A method as in claim 4 where the value of K for some values of $n$ is different than the value of K for other values of $n$.

8. A method as in claim 1 where the succession of pressures $P_n$ is established by generating at least two finite successions of pressures, $P_i$ and $P_j$ respectively, where $i=1, 2, 3 \ldots L$ and $j=1, 2, 3 \ldots Q$ where both of the successions of pressures $P_i$ and $P_j$ include at least some of the values of the said succession of pressures $P_n$ and where Q is a function of L.

9. A method as in claim 8 where $P_i$ is changed to $P_n$ and then $P_j$ is changed to $P_n$ before $P_i$ is changed to $P_{n+1}$.

10. A method as in claim 8 where $P_i$ is changed to $P_n$ and then $P_j$ is changed to $P_{n+1}$.

11. A method as in claim 8 where $P_i$ is changed to $P_{n+1}$ at the same time as $P_j$ is changed to $P_n$.

12. A method as in claim 8 including the steps of:
generating an additional succession of pressures $P_k$, where $k=1, 2, 3 \ldots R$ where each $P_k$ respectively corresponds to each $P_n$ and where R is a function of L;
exposing said uncalibrated vacuum gauge to said pressures $P_k$;
calibrating said uncalibrated vacuum gauge by comparing the readings of said gauge with the calculated values of $P_n$.

13. A device for calibrating at least one vacuum gauge, said device comprising:
a first chamber;
a second chamber connected to said first chamber by an orifice;
vacuum producing means connected to said second chamber by a second orifice;
means for measuring a reference pressure $P_R$, to a desired degree of accuracy;
means for generating a succession of pressures $P_n$ sequentially in time in said chambers, one of said succession being $P_R$, and where $n=1, 2, 3 \ldots L$;
said vacuum producing means continuously pumping said first and second chambers while said pressures $P_n$ are being generated;
$P_{n+1}$ being a function of $P_n$ and the dimensions of said first orifice and said second orifice so that $P_n$ may be calculated from $P_R$; and
said one vacuum gauge being connected to said chambers, the readings of said one vacuum gauge respectively occurring at each of said $P_n$ being correlated to said calculated $P_n$.

14. A device as in claim 13 where said pressure developing means includes means for generating a succession of pressures $P_i$ in said first chamber where $i=1, 2, 3 \ldots L$ and means for generating a succession of pressures $P_j$ in second chamber where $j=1, 2, 3 \ldots Q$, where the relations between $P_i$ and $P_{i+1}$ and $P_j$ and $P_{j+1}$ are both the same as that between $P_n$ and $P_{n+1}$, and where Q is a function of L.

15. A device as in claim 14 including means for changing $P_i$ to $P_n$ and then for changing $P_j$ to $P_n$ before $P_i$ is changed to $P_{n+1}$.

16. A device as in claim 15 where said pressure changing means includes a gate valve means connected between said first chamber and said second chamber for transferring $P_i$ to said second chamber when $P_i$ is equal to $P_n$, thereby changing $P_j$ to $P_n$ before $P_i$ is changed to $P_{n+1}$.

17. A device as in claim 16 where said pressure generating means changes $P_i$ to $P_{n+1}$, when said gate valve means is closed by introducing gas in said first chamber, said device including means for maintaining the reading of a gauge connected to said second chamber constant while $P_i$ is changed to $P_{n+1}$.

18. A device as in claim 14 including means for changing $P_i$ to $P_{n+1}$ at the same time as $P_j$ is changed to $P_n$.

19. A device as in claim 18 wherein said pressure changing means includes at least two bypass valve means serially connected between said first and second chambers and further gauge means connected between said two bypass valve means whereby $P_i$ is transferred to said second chamber when $P_i$ is equal to $P_n$ by closing the bypass valve connected to said first chamber and opening the bypass valve connected to said second chamber, said device including means for maintaining the reading of said further gauge constant while $P_i$ is transferred to said second chamber; said means for generating said succession of pressures $P_i$ operable at the time said pressure transfers to change $P_i$ to $P_{n+1}$.

20. A device as in claim 14 including means for changing $P_i$ to $P_n$ and then for changing $P_j$ to $P_{n+1}$.

21. A device as in claim 20 where said pressure changing means includes vacuum producing means for said first chamber connected thereto by a third orifice where said pressure generating means includes means connected to said second chamber for generating said succession of pressures $P_j$
whereby $P_i$ is changed to $P_n$ by said pressure generating means connected to said first chamber and said vacuum producing means connected to said first chamber.

22. A device as in claim 21 including means for maintaining $P_i$ at the value $P_n$ while $P_j$ is changed to $P_{n+1}$.

23. A device as in claim 13 including a third chamber connected between said vacuum producing means and said second orifice to which said uncalibrated gauges are attached; said device including means for generating a succession of pressures $P_k$ where $k=1, 2, 3 \ldots R$ in said third chamber connected to said third chamber where R is a function of L;
whereby said uncalibrated gauges are eventually calibrated by comparing the readings of said gauges at each of said pressures $P_k$ with the calculated value of $P_k$.

24. A device as in claim 23 where said first chamber is connected to said third chamber by bypass valve means;
said pressure generating means connected to said first chamber changing the pressure in said first chamber from $P_n$ to $P_{n+1}$ with said bypass valve closed;
said pressure generating means connected to said third chamber changing the pressure in said third chamber to $P_{n+1}$ with said bypass valve means open while the reading of a gauge connected to said first chamber is maintained constant.

25. A device as in claim 25 including bypass valve means connected between said second and third chambers whereby the said pressure $P_{n+1}$ is transferred to the second chamber from the third through the last-mentioned bypass valve means when it is open.

26. A device as in claim 13 including
a third chamber connected to said second chamber by a third orifice having a dimension of different value than the orifice connecting said first and second chambers;
means connected to said third chamber for dynamically generating in said second and third chambers a succession of pressure $P_m$ sequentially in time where $m=1, 2, 3 \ldots S$ where S is a function of L;
$P_{m+1}$ being a function of $P_m$ and the ratio of the dimensions of said second orifice to said third orifice so that $P_m$ may be calculated from $P_R$; and
means for selecting either of the pressure changes in said chambers as determined by the relation between $P_{n+1}$ and $P_n$ or the relation between $P_{m+1}$ and $P_m$.

References Cited

A. P. Flanick and J. E. Ainsworth, "Vacuum Gauge Calibration System ($10^{-2}$ to $10^1$ mm. Hg)," The Review of Scientific Instruments, vol. 32, No. 4, April 1961, pp. 408–410.

LOUIS R. PRINCE, *Primary Examiner.*

H. C. POST III, *Assistant Examiner.*